INVENTOR
William M. Hanley
BY Dressler, Goldsmith, Clement & Gordon
ATTORNEYS

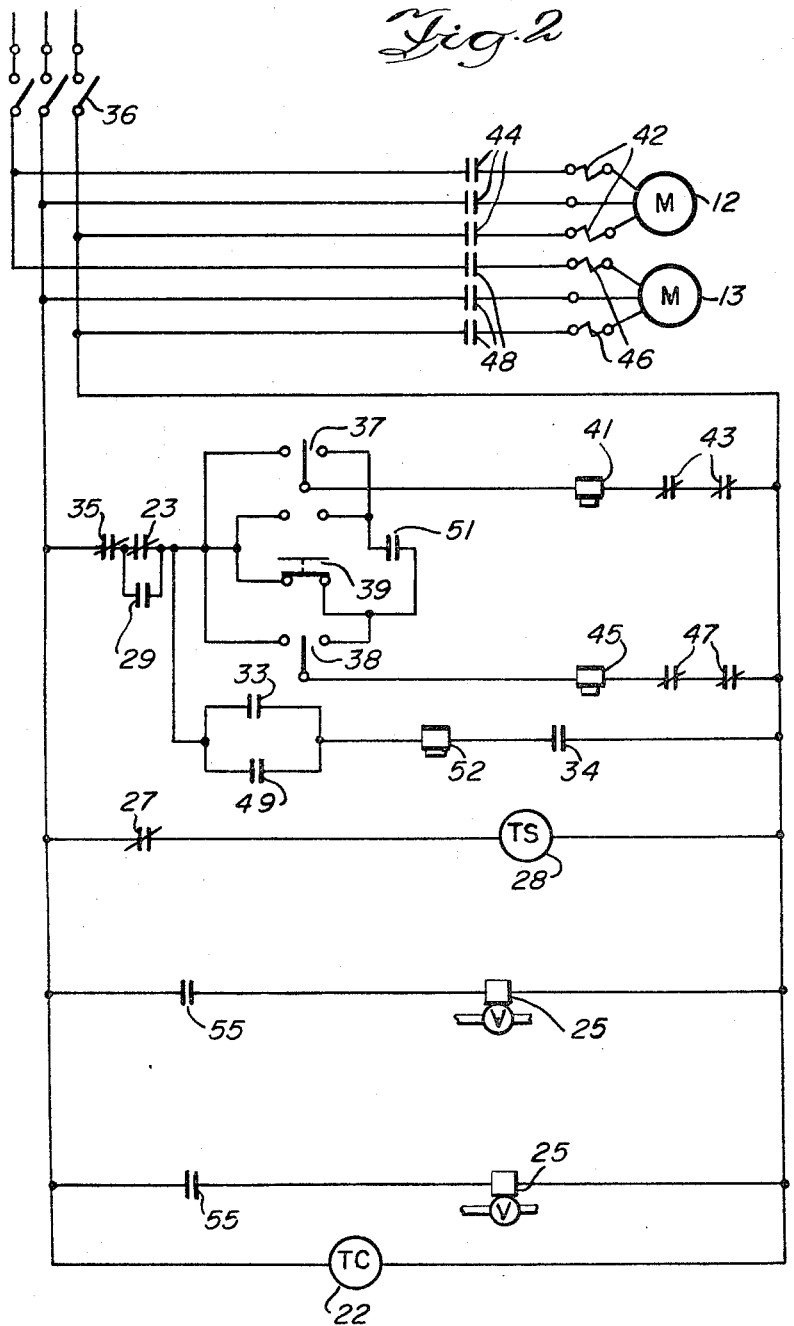

United States Patent Office
3,431,940
Patented Mar. 11, 1969

3,431,940
SHUT-OFF FOR PRESSURE CONTROLLED LIQUID FLOW SYSTEM AT ZERO FLOW
William M. Hanley, Evanston, Ill., assignor to FMC Corporation, a corporation of Delaware
Filed July 13, 1966, Ser. No. 564,960
U.S. Cl. 137—565
Int. Cl. E03b 5/00, 11/00
4 Claims

ABSTRACT OF THE DISCLOSURE

A liquid flow system for delivering liquid at a constant pressure in response to variable flow demands which is operable in different modes during periods of anticipated flow demand and periods of no anticipated flow demand. During periods of anticipated flow demand, the electrical motors for operating the system pumps are under the control of a timer which prevents the motors from cycling on and off. During periods of no anticipated flow demand, the motors are under the control of a dual setting pressure switch, which has a first setting to shut off the system pumps when pressure rises a predetermined amount above the system pressure, and which starts the motors when the pressure drops a predetermined amount below the system pressure. A timer delay switch is energized by the dual setting pressure switch for retaining the motors energized for a predetermined period during periods of no anticipated flow demand, so that the motor windings will be cooled.

---

Figure 1:
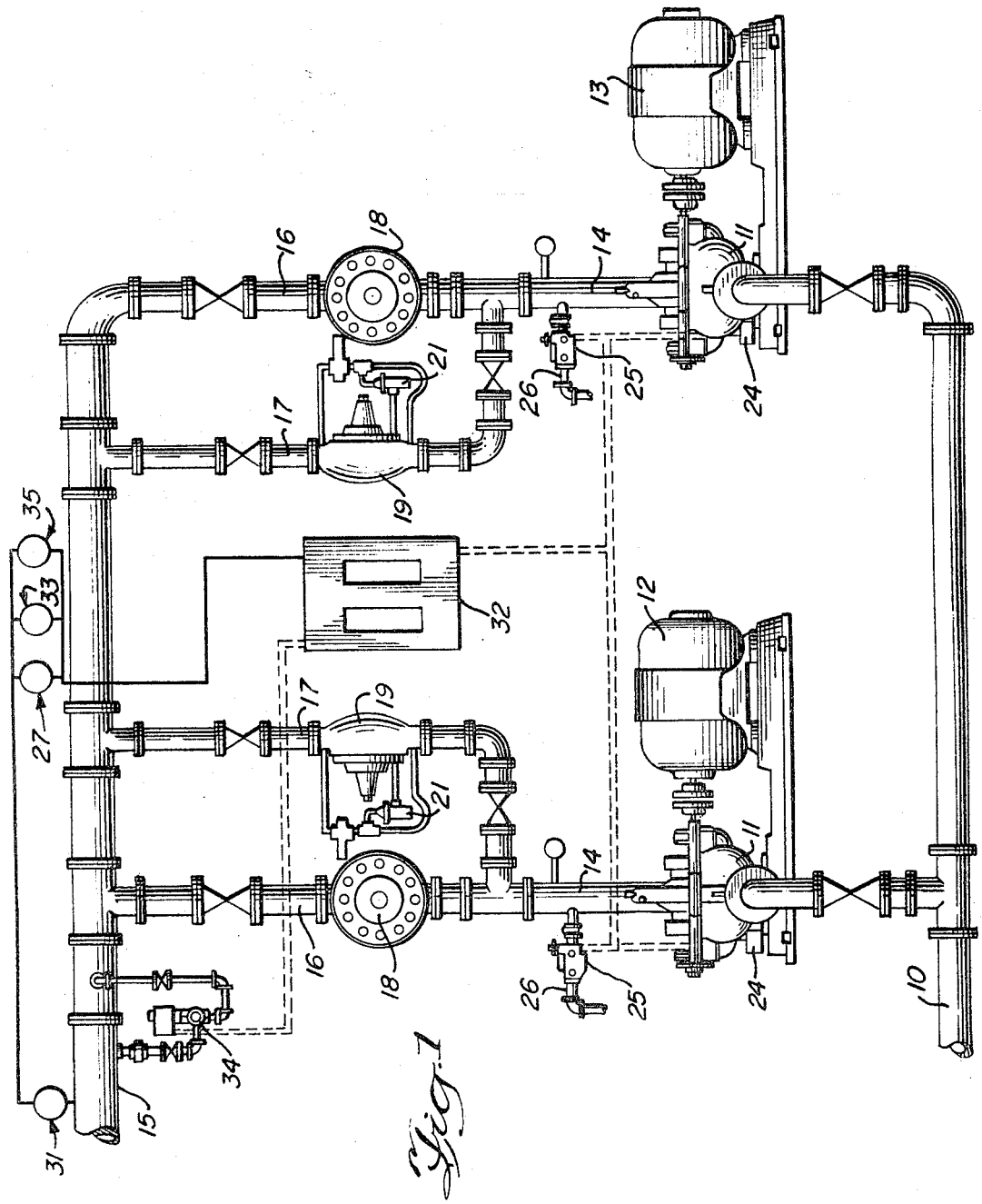

The invention relates to a liquid flow system of the type disclosed in United States Patent No. 3,135,282, in which a plurality of constant speed motors operate a series of pumps for delivering water or other liquid at a constant pressure in response to variable flow demands, and is particularly concerned with means for completely shutting off the last pump remaining in operation during periods when zero flow demand is anticipated.

Although liquid flow systems of the type herein discussed comprise a plurality of motors and pumps, it should be understood that the operation of the multiple pump system is fully described in the aforesaid patent, and the present invention is concerned with only one motor and one pump, specifically the last motor and pump remaining in operation after the flow demand is reduced, so that it may be satisfied by a single pump. Accordingly, any reference hereinafter to "the motor" or "the pump," unless otherwise specified, will be understood to refer to the last motor or pump remaining in operation after the other motors and pumps of the system are shut off.

When the flow demand stops in previously known liquid flow systems of the type with which this invention is concerned, the system pressure will increase about four to five pounds per square inch before the pressure regulating valve will shut tight, and the pump continues to operate after the pressure regulating valve is shut tight. The continued operation of the pump heats the water, which is then being pumped through the closed path, until it reaches a predetermined temperature, at which time a heat valve opens to purge the hot water.

In accordance with the present invention, a dual setting pressure switch shuts off the motor for operating the pump when the system pressure rises a predetermined extent at zero flow, thereby shutting off the pump completely, and saving power, wear and tear on the motor and pump, and water.

When the system pressure drops a predetermined amount, the dual setting pressure switch energizes the motor to restart the pump. The pressure drop may be caused by flushing a single toilet, or similar flow demand. If the flow demand is caused by an isolated incident, the system pressure rises immediately when the pump is restarted. A time delay switch is wired into the circuit to prevent the motor from shutting off until the lapse of a predetermined time period after it is started, in order to allow the motor blower to cool the windings of the motor before the motor is shut off.

A time clock is connected to the electrical circuit to prevent the motor from being de-energized during certain predetermined periods of time. The periods of time during which the motor is not de-energized by a rise of pressure otherwise sufficient to de-energize it is when a flow demand is anticipated. For example, a continuous flow demand would be anticipated during the class hours of a school, or the work hours of a factory, and it is not desirable to start and stop the motor under momentary zero flow conditions during periods of anticipated continuous flow demands. Accordingly, the pump operates continuously during the periods when a flow demand is anticipated. During the night, when no flow demand is anticipated, it is not objectionable to start the motor when the system pressure drops, and to stop it as soon as the time delay permits, because the very limited occupancy of the building indicates that the motor will not again be started for a considerable length of time.

Suitable structure by means of which the above mentioned and other advantages are attained will be described in detail in the following specification, taken in conjunction with the accompanying drawings showing a preferred illustrative embodiment of the invention, in which:

FIGURE 1 is a front elevational view of the apparatus comprising a liquid flow system embodying the invention; and FIGURE 2 is a diagrammatic view of the electrical wiring for operating the apparatus.

Referring to the drawings, an inlet 10 connects a source of water under pressure, as from a city main, to a pair of pumps 11, each operated by a constant speed electric motor 12 or 13. The line 14 leading from each pump is connected to a discharge outlet 15 by a pair of conduits 16 and 17. The conduit 16 has a main pressure regulating valve 18, and the line 17 has an auxiliary pressure regulating valve 19 connected in parallel to the main valve.

The valve 18 is normally larger than valve 19 and is set to have a discharge pressure slightly less than the discharge pressure of the auxiliary valve. This causes the main valve to close when the flow demand drops below a predetermined minimum, while the auxiliary valve remains open to supply the limited flow demand. The auxiliary valve 19 has a nedele valve 21 that controls the flow of water from the valve bonnet and dampens the tendency of the valve to pulsate on low flows. If the flow demand drops to zero, the valve 19, which is also a check valve, will tend to close, and the pressure will increase to a maximum of from four to five pounds per square inch above the system pressure before the valve shuts tight. If the flow demand remains at zero, the temperature of the water circulating through the pump casing will start going up. If the water gets too hot, a heat detecting device 24 actuates its contact to open a solenoid controlled relief valve 25 that purges the pump casing of the hot water by bleeding it through a conduit 26. The purging of the hot water in the pump casing will cause the hot water to be replaced by cold water from the source of the water, but will not reduce the excess pressure. Accordingly, the purging of the hot water will occur at intervals, whenever the water gets too hot, until a flow demand occurs.

If a zero flow demand occurs during a period when flow demands are usually anticipated, as during the working days of a factory or school, the system will be under the control of a time clock 22 which will hold a contact 23 closed, and thereby prevent the motor from shutting off. During the period of anticipated flow demand, it is expected that the periods of zero flow demand will be short, and it is undesirable to have the pump stop everytime the flow demand becomes zero, and then start again as soon as a flow demand occurs. The pump is kept operating continuously to save the wear and tear incidental to frequent stops and starts.

When no flow demand is anticipated, as, for example, during the night when a watchman may be the sole occupant of the building, the periods of flow demand will be short and the periods of zero flow demand will be long. At such times, the system is under the control of a normally closed dual setting pressure controlled switch 27 instead of the time clock. Whenever a zero flow demand remains long enough to cause the pressure to increase to its maximum, from four to five pounds per square inch above the system pressure, the switch 27 opens to stop the motor and the pump. Any flow demand will increase the pressure. If the flow demand remains above zero long enough to reduce the pressure to about four pounds below the system pressure, the switch 27 closes to start the motor by energizing a normally open time delay switch 28 which in turn starts the motor through its contact 29. The time delay switch 28 will remain energized until the system pressure rises from four to five pounds above the system pressure indicating zero flow, at which time pressure switch 27 opens and de-energizes the timer. When the timer is de-energized, the timing interval starts, and timer contact 29 will remain closed until the timer has timed itself out, after which contact 29 opens and stops the pump, thereby preventing recycling of the pump. The motor cannot be shut off until it has run long enough for the blower to cool the windings of the motor. Even if the flow demand becomes zero immediately after the motor is started, the pump will continue to run until the expiration of the time period for which the switch 28 is set. The switch 28 opens after the expiration of its time period.

Although the time clock control and the time delay switch of the present invention are intended for use when the flow demand requires only a single motor and pump, they are usually installed with duplicate pump and valve systems connected through a control panel 32, as shown in FIGURE 1. When the flow demand increases beyond the capacity of the auxiliary valve 19, the pressure drops, and the valve 18 is opened. If the flow demand continues to increase, additional pumps and valves are activated to supply the demand. A pressure gauge 31 is mounted in the discharge pipe 15 to indicate the discharge pressure, and a pressure controlled switch 33 energizes the motor 12 to operate a second pump 11. The second motor is shut off by a flow control switch 34 when the flow demand drops to a point where it can be satisfied by a single pump. The system is also provided with a second pressure controlled switch 35 to shut off both pumps in the event of an extraordinary drop in pressure.

The electrcal circuitry for the entire duplicate system is shown in the diagram of FIGURE 2. The constant speed motors 12 and 13 are connected to a power source by main switches 36. The circuit includes independent selector switches 37 and 38 for motors 12 and 13, respectively. A pump transfer switch 39 is provided so that either motor 12, or 13 may run, with the other as a standby in case the flow demand exceeds the capacity of one pump. As shown in FIGURE 2, the switch 39 is thrown in position for operation of motor 13, and motor 12 is the standby motor.

The circuit for the motor 12 includes a starter comprising a solenoid 41, a pair of overload heaters 42, normally closed contacts 43, and normally open contacts 44. The circuit for the motor 13 is similarly provided with a starter comprising a solenoid 45, a pair of overload heaters 46, normally closed contacts 47, and normally open contacts 48. The pressure controlled switch 33 energizes and de-energizes solenoid 52 through flow switch 34. Solenoid 52 maintains its circuit through its contact 49 when pressure rises. Solenoid 52 also closes contact 51 startng the second pump. When the motor 13 is in operation and the pump 11 connected thereto is supplying the flow demand of the system at the required discharge pressure, the switch 33 remains open, thus de-energizing solenoid relay 52 and thereby opening contacts 49 and 51. The electrical circuit will remain the same as long as the single pump continues to supply the flow demand.

The circuit also contains a normally open temperature actuated switch 55 and a solenoid valve 25. At a predetermined temperature, switch 55 will close, thereby closing the circuit and energizing the solenoid valve 25 to allow discharge of the hot water through conduit 26.

What is claimed is:

1. A liquid flow system adapted to supply liquid at a constant discharge pressure comprising a pump connected to a source of liquid under pressure, a discharge pipe for providing fluid under pressure to a liquid flow system, conduit means interconnecting the pump and discharge pipe, a pressure regulating valve controlling the flow at a set pressure through said conduit means, a motor for operating said pump and electrical means for continuously energizing said motor during periods of anticipated flow demand, said electrical means including a dual setting pressure switch means for controlling said motor during periods of no anticipated flow demand by sensing the system pressure in said discharge conduit, said pressure switch means having a first pressure setting to shut off said motor under zero flow conditions indicated by a predetermined pressure rise above the system pressure, and said pressure switch means having a second pressure setting to start said motor upon a predetermined pressure drop in said system pressure.

2. A liquid flow system as recited in claim 1 in which said electrical means includes means to insure a predetermined time interval between the starting and stopping of said motor to prevent rapid recycling of said pump.

3. A liquid flow system as recited in claim 1 in which said electrical means includes a time delay switch that is energized and de-energized by said pressure switch means, said time delay switch retaining said motor energized for a predetermined time interval immediately after the time delay switch is de-energized to prevent stopping said motor immediately after it is started.

4. A liquid flow system as recited in claim 1 in which said electrical means includes a timing device that is energized and de-energized by said pressure switch means, said time delay switch retaining said motor energized during predetermined periods to prevent it from shutting off said motor during said predetermined periods of time regardless of any increase of pressure in said system.

References Cited

UNITED STATES PATENTS

| 1,560,044 | 11/1925 | Derrick | 137—565 |
| 2,582,259 | 1/1952 | Koplin et al. | 137—565 |
| 2,628,995 | 2/1953 | Shanklin | 103—25 |
| 2,707,440 | 5/1955 | Long et al. | 103—25 |
| 2,888,875 | 6/1959 | Buck | 103—25 |
| 2,981,195 | 4/1961 | Payne et al. | 103—25 |
| 3,135,282 | 6/1964 | Gray | 137—114 |
| 3,195,555 | 7/1965 | Schaub | 137—114 |
| 3,229,639 | 1/1966 | Hignutt et al. | 103—25 |

M. CARY NELSON, *Primary Examiner.*

WILLIAM R. CLINE, *Assistant Examiner.*

U.S. Cl. X.R.

137—567